United States Patent
Schneider et al.

(10) Patent No.: US 8,655,461 B2
(45) Date of Patent: Feb. 18, 2014

(54) METHOD, SYSTEM, AND NON-TRANSITORY COMPUTER READABLE STORAGE MEDIUM FOR GENERATING CODE FOR A CLOSED-LOOP CONTROLLER

(75) Inventors: Roland Schneider, Magdeburg (DE); Richard Gary McDaniel, Hightstown, NJ (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 309 days.

(21) Appl. No.: 12/786,938

(22) Filed: May 25, 2010

(65) Prior Publication Data
US 2011/0295391 A1 Dec. 1, 2011

(51) Int. Cl.
*G05B 11/01* (2006.01)
(52) U.S. Cl.
USPC ............... 700/30; 700/31; 703/13; 703/22
(58) Field of Classification Search
USPC ............ 703/2–4, 13, 22; 700/29–31, 44–45
See application file for complete search history.

(56) References Cited

U.S. PATENT DOCUMENTS

| | | | | |
|---|---|---|---|---|
| 6,088,689 | A * | 7/2000 | Kohn et al. | 706/10 |
| 6,789,054 | B1 * | 9/2004 | Makhlouf | 703/6 |
| 6,901,309 | B2 * | 5/2005 | Hertinger | 700/174 |
| 6,999,869 | B1 * | 2/2006 | Gitlin et al. | 701/115 |
| 7,421,308 | B2 * | 9/2008 | Nussbaum et al. | 700/186 |
| 7,865,254 | B2 * | 1/2011 | Gahinet et al. | 700/37 |
| 2004/0137294 | A1 * | 7/2004 | Kolodziej et al. | 429/25 |
| 2007/0239290 | A1 * | 10/2007 | Nussbaum et al. | 700/77 |
| 2008/0059138 | A1 * | 3/2008 | Tremblay et al. | 703/11 |
| 2008/0147209 | A1 * | 6/2008 | Landgraf | 700/29 |
| 2008/0172212 | A1 * | 7/2008 | Gahinet et al. | 703/6 |
| 2009/0055156 | A1 * | 2/2009 | Cooper | 703/22 |
| 2009/0132993 | A1 * | 5/2009 | Mani et al. | 717/105 |
| 2010/0174395 | A1 * | 7/2010 | Gu et al. | 700/110 |
| 2010/0312364 | A1 * | 12/2010 | Eryilmaz et al. | 700/30 |
| 2011/0015916 | A1 * | 1/2011 | Kataoka et al. | 703/19 |
| 2011/0093250 | A1 * | 4/2011 | Lin | 703/7 |

FOREIGN PATENT DOCUMENTS

EP 1832947 A2 9/2007

OTHER PUBLICATIONS

PCT Search Report mailed Sep. 9, 2011 corresponding to PCT International Application No. PCT/US2011/037532 filed May 23, 2011 (9 pages).

* cited by examiner

*Primary Examiner* — Mohammad Ali
*Assistant Examiner* — Nathan Laughlin

(57) ABSTRACT

A system, method, and computer readable medium. A method includes receiving input for a simulation model, the simulation model including a sensor. The method includes concurrently executing the simulation model and control code for a simulated physical controller, where the control code interacts with the simulation model according to a state of the sensor. The method includes generating revised control code based on the executed simulation model and control code, and generating controller-specific control code based on the revised control code. The method includes executing the simulation model and the controller-specific control code, the controller-specific control code interacting with the simulation model.

21 Claims, 3 Drawing Sheets

METHOD, SYSTEM, AND NON-TRANSITORY COMPUTER READABLE STORAGE MEDIUM FOR GENERATING CODE FOR A CLOSED-LOOP CONTROLLER

TECHNICAL FIELD

The present disclosure is directed, in general, to systems and methods for use in computer-aided design, manufacturing, using, modeling, and visualization (individually and collectively, "CAD" and "CAD systems") and in product lifecycle management ("PLM") and other systems.

BACKGROUND OF THE DISCLOSURE

Many manufactured products are first designed and modeled in CAD systems, and PLM systems are used my manufacturers, retailers, customer, and other users to manage the design, use, and disposal of various products. Improved systems are desirable.

SUMMARY OF THE DISCLOSURE

Various embodiments include a system, method, and computer readable medium. A method includes receiving input for a simulation model, the simulation model including a sensor. The method includes concurrently executing the simulation model and control code for a simulated physical controller, where the control code interacts with the simulation model according to a state of the sensor. The method includes generating revised control code based on the executed simulation model and control code, and generating controller-specific control code based on the revised control code. The method includes executing the simulation model and the controller-specific control code, the controller-specific control code interacting with the simulation model.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
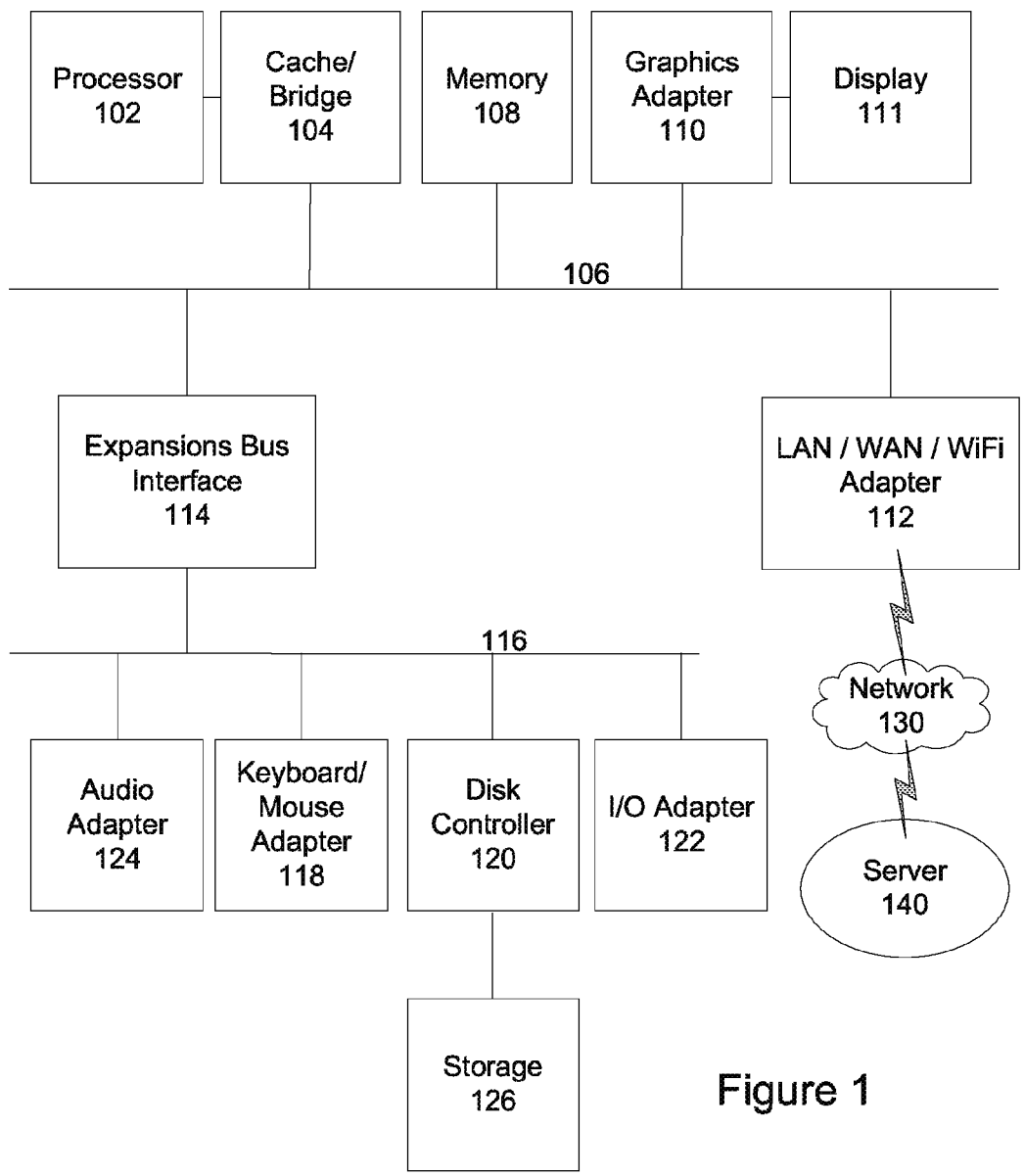
FIG. 1 depicts a block diagram of a data processing system in which an embodiment can be implemented.
Figure 2:
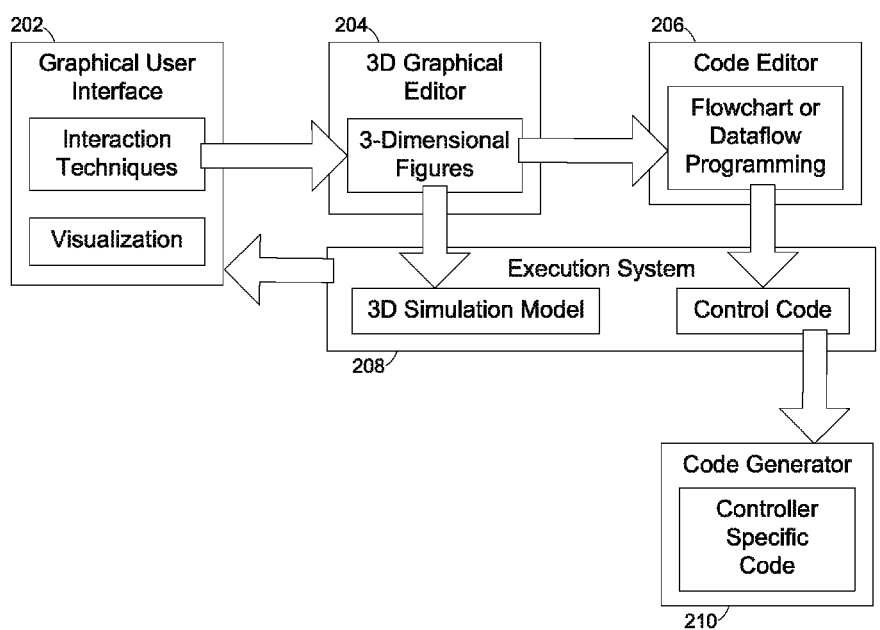
FIG. 2 shows a block diagram of a system architecture in accordance with disclosed embodiments.
Figure 3:
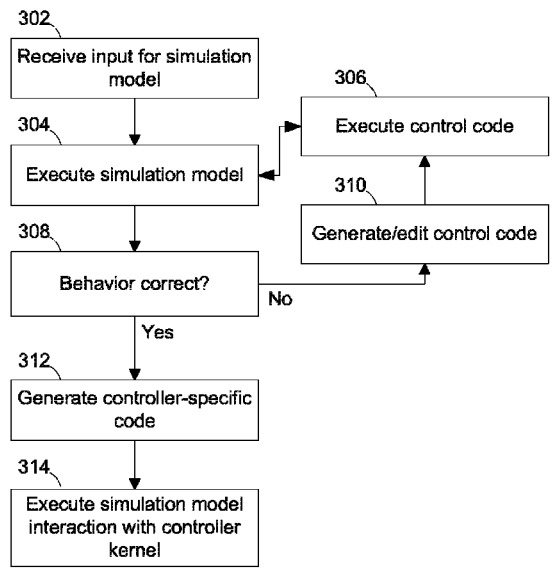
FIG. 3 shows a flowchart for a process in accordance with disclosed embodiments.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Increasingly, production machines and other devices are controlled by digital controllers. In the past, production machines have been characterized by one large motor driving one central, upright shaft. Different kinds of gearings physically translate and distribute the motion of that shaft to a number of actuators.

Modern machines consist of decentralized actuators that move and process the work goods through the machine and sensors that monitor the state of the production process. The coordination of the actuators with respect to the state of the production process is performed by software running on a digital controller. The benefit of this approach is that those machines can be easily adapted to produce new products or to changes in the production process by editing the controller software.

Since a machine's functions are now specified in software instead of physical gearing, the complexity of producing working mechanics has become a programming problem. The programmer of the digital controller needs to have expertise in what have previously been separate domains. The programmer needs to have deep mechanical and process understanding of the machine and also has to have skills in the programming language used on the controller. Due to those different demands, currently, only highly qualified personnel can generate the code to automate modern production machines and even for those qualified experts, it still takes a great deal of time and testing before the machine can go into production.

Disclosed embodiments alleviate the programmer's burden by supplying an interactive system for developing controller programming that more closely matches the intuitive notion of how a mechanical system works.

FIG. 1 depicts a block diagram of a data processing system in which an embodiment can be implemented and configured to perform processes described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Currently, users or other users are required to program controllers for production systems in traditional programming languages, possibly by using a data processing system 100, and so may be required to learn specific programming requirements and languages for each implementation. A large amount of time is invested to refine the user's skills for programming and testing the controller software on the real machine.

Some robotics systems use open-loop programs that perform without any real-time feedback. Programming these robotics systems uses a method of recording the motion planning for the different actuators of the robot that can then be demonstrated on a real or virtual robot. The recorded motions are used by the controller to provide open-loop position control of the robot's actuators. These techniques cannot properly operate closed-loop systems that respond to real-time input during controller operation. The robot's programmed motion is fixed and does not take into account the physical interaction of the robot with its surroundings.

Disclosed embodiments provide systems and methods for programming closed-loop automation systems where sensing and other conditions affect the controller behavior. Various embodiments include a method for generating controller software by using an integrated virtual simulation model. The model reproduces the essential mechanical/physical behavior of the machine.

FIG. 2 shows a block diagram of a system architecture in accordance with disclosed embodiments, that can be implemented on a particularly-configured data processing system.

The user interacts with the system via a graphical user interface 202. Graphical user interface 202 can include user interaction techniques such as mouse dragging to apply motion or forces to objects, trigger sensors, full control over starting, stopping, and reversing the running time, and others. Graphical user interface 202 can include visualization features such as a three-dimensional (3D) simulation model, sensor and actuator states, control code states, and other information useful to a user for interacting with and understanding the simulation.

The system also employs a 3D graphical editor 204 that can manipulate and maintain a 3D graphical model. For example, the model may include, but is not restricted to, mechanical elements like structural parts, coupling elements like guides and gearings, detection areas of sensors and the geometric position of these elements, material flow, and change of product state. The model's objects are represented as three dimensional figures that are arranged in the 3D graphical editor 204. The model is displayed by the system using 3D graphical methods known to those of skill in the art.

According to various embodiments, the simulation model includes at least three kinds of objects. Some objects represent the physical aspects of the machine itself. This includes various solid surfaces, lever arms, and other mechanical elements. It also includes conceptually physical traits such as two objects being joined at a hinge or the flow direction of worked material.

Other objects represent the work product the machine acts upon. For a conveyor system, for example, the product could be the objects that ride the conveyor. For a forming machine, as another example, the product would be the raw material that gets formed as well as the product after the forming occurs.

The final set of objects is sensors and actuators within the machine that cause behaviors to occur. A motor, for example, could apply a force that moves a lever arm in the machine or a laser sensor could read the position of a box as it passes through a gateway.

In addition to the 3D simulation model and associated 3D graphical editor 204, the system in some embodiments also contains a code editor 206 for programming control behaviors. These behaviors include the instructions that actuators use to effect the machine's operations properly. Input values can come from sensors in the simulation model as well as intrinsic events such as timing and other data sources. The code editor 206 can use conventional programming languages, or can preferably use flowchart or dataflow programming techniques.

The code is developed through an interaction with the system, using a diagrammatic language such as flow chart or dataflow programming. The user may edit the control code directly at any time; in a preferred embodiment, the system allows the simulation environment to be used to create code automatically. The system also has an interpreter to run the control code during simulation.

The system includes an execution system 208 that executes the 3D simulation model and the control code for the simulated or actual controllers. The 3D simulation model allows the user to manipulate the 3D figures of the 3D graphical editor 204 using interaction techniques of graphical user interface 202. For example, mouse dragging or similar input to the system can be used to change the position and speed of objects, apply forces and torques, trigger sensors, etc. During this real time manipulation of the simulation model, a physical simulation is executed and displayed by the system according to the mechanical/physical behavior of the machine the user manipulation. The model can also generate the state of sensors by computing how each sensor would react to its current surroundings. The execution system 208 can also run the currently-specified control code to update the effects produced by the actuators.

Various embodiments allow the user to use the simulation model in order to review and edit the control code in the execution system 208. While interacting with the user, the system runs the simulation model. In response to user actions, the system starts, stops, and reverses the running time. While the simulation is running, the system also executes control code so the user can see all the parameters of the actuators including whether they are active or inactive. At any point, the user can pause the simulation model, at which point the system freezes the values of the simulation objects and displays the state of the control code for every actuator. This simulation and the interaction with the user can be used to create the control code in the execution system 208.

The system can backup or move forward in time to find the exact point where an important event occurs or is meant to occur, in response to input received from the user or other user.

While the simulation is paused, the user has several options for changing the code. Of course, the user can edit the code directly using the code editor 206. The user can also take a "snapshot" of the simulation model in its current state. The snapshot is effectively a recording of all the actuators in their current state. The system provides the user with a snapshot object that is available in the code editor. Inserting the snapshot into the code provides instructions for putting all the actuators into the same state as recorded. In some cases, the snapshot object can be implemented as a code instruction that is made part of the control code of execution system 208. The snapshot object can be used as an instruction to make the machine conform to a specific mode of behavior.

For example, a snapshot can be created for the time when the machine is running normally and another snapshot for when the machine is in a diagnostic mode. The user can inspect the snapshot object and edit it manually to give it a name; to remove extraneous state variables; and to add parameters and conditions.

The user can also drag objects from the simulation model into the code to create new instructions. The kinds of instructions that are created depend on the context of the simulation object being dragged.

To create a conditional expression, in some embodiments, the user drags a sensor object into the code. The sensor object in the simulation will have a property value that determines its state. For example, a photo diode sensor will have a binary value that changes when an object passes through its corresponding light beam. The automatically created instructions for the sensor will be a test whether the sensor's property value is equal to its current value in the simulation. Dragging multiple sensor objects into the code causes the system to create instructions testing each of the sensor's values and unites them into a single test using logical AND. The user may edit the logic of the expression directly if another expression is needed.

If the user drags an actuator object into the code, the system automatically creates instructions to modify the actuator's properties into its current state. The created instructions are the same as would be created for a snapshot object but are specific for the dragged actuator. The user can modify the instructions as needed. Dragging a part of the machine that is not a sensor or actuator into the control code causes the system to create state variables that present the state of the object. The system will create variables for state that can be determined given the state of actuator objects. The system reports an error if the user drags work piece objects into the control code or machine parts that are similarly affected only by physical interaction. Since physical interaction occurs outside the control program, the control code cannot contain references to these variables.

The user can also create instructions by modifying the state of an actuator in the model simulation. When the simulation is paused, the user may edit its objects using the 3D graphical editor. If the user edits an actuator, the instructions for causing that change are added to the control code. For example, if the user activates a motor, code for activating that motor is added to the code. A sequence of actions may be demonstrated by reactivating the simulation and pausing it again repeatedly or by using the time controls to move forward and backward in time. After each pause, the user modifies the state of the actuators to their proper values. The system will automatically insert timing instructions between each action in the sequence.

The user can replace the timing instructions with other code as needed such as by dragging in a sensor object to create a conditional test. In some embodiments, the receipt of edited objects other than actuators in the simulation model does not cause the system to add instructions to the control code. Such edits are treated as external forces like a machine operator manually moving part of the machine or other effects that cannot be controlled.

Once the user reaches the point where he is satisfied with the behavior of the machine, the system can translate, compile, or otherwise process the software code generated by his interaction with the model into controller specific software that is executable on digital controllers, shown as the controller specific code in code generator 210. Since the user has access to the generated code, refinements that are specific to the control hardware can be applied to the controller software. To verify the correctness of the translated code, the code can be tested against the simulation model representing the mechanical/physical behavior of the machine by connecting a real or virtual controller to the actuators and sensors inside the simulation, by connecting other physical devices to the system or by separately executing virtual controllers and other hardware by the system.

When running in this mode, the simulation model runs its physical simulation normally but it allows the state of the actuators to be controlled by the external or simulated device. Similarly, the state of the sensors can be sent to the controller instead of being used internally.

One general advantage of applying a running simulation model while writing control software is that it makes the software operations more clear, easier to formulate, and easier to test.

One advantage is that having a running simulation of the physical process available simplifies a great many issues. The user is no longer guessing what effects a given piece of code will have. The code just runs and the effects on the simulation are normally easy to see. Since the simulation is virtual, it is easy to view any property of the process including those that would be difficult to instrument on a physical machine. Since the user can control the simulation time, it is straightforward to find when something happens or is supposed to happen.

Another advantage is that the simulation model provides intuitive scaffolding for understanding the control code. Normally control software is written without an explicit representation of the machine it controls. The programmer must infer how the machine works using other documentation or by guessing the meaning of the software's variable names. Using disclosed embodiments, the simulation shows anyone who reads the code exactly what the code is affecting and how it relates to other mechanisms within the device. By running the simulation, the programmer can see how the machine works in fully animated and interactive 3D graphics.

Another advantage is that code and simulation are explicitly linked together. It is possible to inspect the code using the simulation as a guide and it is also possible to inspect the simulation guided by the code. Because the names of the simulation and code are directly tied together, one can jump back and forth between control and simulation seamlessly.

Creating new instructions is less error prone when one uses the simulation objects because the system will specifically create code for that object. The user does not have to type in the names of sensor or actuators thereby reducing the possibility of getting the names wrong or accidentally sending instructions to the wrong object. Furthermore, the values of the sensor and actuator properties are coming from the simulation as it is running. Thus, the values are known to be correct for the device. For example, it is less likely that the programmer will mistakenly test a sensor for a true status when in actuality; it was supposed to be false.

In general, various embodiments disclosed herein reduce the difficult task of translating the intended machine behavior, only present in the user's mind, into software code. Instead of having to recall everything about programming and how to manage the device, the user points at what needs to be affected and drags it into the code.

FIG. 3 shows a flowchart for a process in accordance with disclosed embodiments. The high-level flowchart is described with relation to a process for generating controller software by using an integrated virtual simulation model as described herein. Such a process can be performed by a single data processing system or multiple data processing systems operating together, either case referred to in the singular as "a data processing system".

The system first receives input for a simulation model (step 302). Receiving, as used herein, can include loading from storage, receiving from another system such as over a network, building the simulation model via an interaction with a user, or otherwise, including combinations of these.

In various embodiments, the simulation model is a mechanical/physical 3D simulation model that can include mechanical elements that interact with each other, elements that constrain motion, such as hinges, work products, sensors, actuators, and others, as described herein. This step can also include receiving control code that controls one or more simulated physical controllers, from storage, another system, an interaction with a user, or otherwise, including combinations of these.

The system executes the simulation model (step 304) and concurrently executes the control code that controls one or more simulated physical controllers (step 306). In FIG. 3, these steps are shown interacting with each other since the physical simulation, when executing, interacts with the control code execution to show the operation of the simulated physical controller. This concurrent execution effectively simulates a closed-loop controller system, where the simulation model and controller modify their behavior according to the sensors and actuators present in the simulation model.

As part of steps 304 and 306, the system can interact with a user as the simulation model and control code is executing. The system monitors the states of the sensors and actuators represented in the simulation model, and takes "snapshots" of these states and the corresponding state and operation of the simulation model.

The system determines if the behavior of the simulation model and simulated physical controller is correct (step 308), which can include receiving a user indication as to whether the behavior is correct for the intended operation.

If the behavior is not correct, the system generates revised control code (step 310). This step can include generating or editing the revised control code based on the snapshots, receiving input from a user, or otherwise. Preferably, the user can use a graphical interface to insert snapshots, objects, or other input to the system as a basis for the generated code, and this step can also include directly receiving new or edited control code from a user. This step can include using the values of objects in the simulation model to create new or revised control code. The system then returns to steps 304 and 306 to continue execution.

In some embodiments, the system continually loops between steps 304, 306, 308, and 310 until the behavior is determined to be correct. In this way, the system is effectively performing real-time simulation and interaction with the user, generating revised control code and executing the revised control code and the simulation model as the user interacts with the system to modify the behavior of the simulation and simulated physical controller. As the user manipulates the simulation model, the simulated physical control, the states of actuators, sensors, and other objects, and the control code itself, the displayed simulation model is immediately updated.

When the behavior is determined to be correct (at step 308), the system will then automatically generate controller-specific code based on the current state of the control code and/or simulation model. This step can include receiving, from a user or otherwise, an indication of the specific model or specifications of the specific controller for which the code is to be generated, and receiving any relevant data for the specific controller necessary for generating the controller-specific code, including the kernel for the specific controller. "Specific controller", as used herein, can indicate a unique controller or device, or can indicate a specific type or model of controller that can be used for a variety of devices.

The system then again executes the simulation model, this time in communication with the kernel for the specific controller (step 310), where the kernel executes the controller-specific code. This step can include executing a simulation of the specific controller that includes the kernel, or communicating with an actual specific physical controller that includes the kernel. In this way, the simulation model can display a simulation that interacts directly with the specific controller (or simulation of the specific controller) to ensure that the controller-specific code is correct. This step can include receiving edits or revisions to the controller-specific code.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for generating code for a closed-loop controller, comprising:
   receiving input for a simulation model in a data processing system, the simulation model including a sensor;
   concurrently executing the simulation model and control code for a simulated physical controller in the data processing system, the control code interacting with the simulation model according to a state of the sensor, the control code including instructions automatically generated by the data processing system at least partially in response to the data processing system receiving a user input of a sensor object being dragged into the control code;
   generating revised control code, by the data processing system, based on the executed simulation model and control code;
   generating controller-specific control code based on the revised control code by the data processing system; and
   executing the simulation model and the controller-specific control code, the controller-specific control code interacting with the simulation model.

2. The method of claim 1, wherein the concurrently executing and generating revised control code steps are performed repeatedly until the data processing system receives an indication that a behavior of the simulation model is correct.

3. The method of claim 1, wherein the generating revised control code includes modifying the control code based on the state of the sensor.

4. The method of claim 1, wherein the controller-specific control code is executed using a specific controller corresponding to the controller-specific control code.

5. The method of claim 1, wherein the controller-specific control code is executed using a simulation of a specific controller corresponding to the controller-specific control code.

6. The method of claim 1, wherein the simulation model also includes an actuator.

7. The method of claim 1, wherein the control code controls a simulated physical controller.

8. A data processing system comprising a processor and accessible memory, the data processing system particularly configured to perform the steps of:
   receiving input for a simulation model, the simulation model including a sensor;
   concurrently executing the simulation model and control code for a simulated physical controller, the control code interacting with the simulation model according to a state of the sensor, the control code including instructions automatically generated by the data processing system at least partially in response to the data processing system receiving a user input of a sensor object being dragged into the control code;
   generating revised control code based on the executed simulation model and control code;
   generating controller-specific control code based on the revised control code; and
   executing the simulation model and the controller-specific control code, the controller-specific control code interacting with the simulation model.

9. The data processing system of claim 8, wherein the concurrently executing and generating revised control code steps are performed repeatedly until the data processing system receives an indication that a behavior of the simulation model is correct.

10. The data processing system of claim 8, wherein the generating revised control code includes modifying the control code based on the state of the sensor.

11. The data processing system of claim 8, wherein the controller-specific control code is executed using a specific controller corresponding to the controller-specific control code.

12. The data processing system of claim 8, wherein the controller-specific control code is executed using a simulation of a specific controller corresponding to the controller-specific control code.

13. The data processing system of claim 8, wherein the simulation model also includes an actuator.

14. The data processing system of claim 8, wherein the control code controls a simulated physical controller.

15. A non-transitory computer-readable storage medium encoded with computer-executable instructions that, when executed, cause a data processing system to perform the steps of:
- receiving input for a simulation model, the simulation model including a sensor;
- concurrently executing the simulation model and control code for a simulated physical controller, the control code interacting with the simulation model according to a state of the sensor, the control code including instructions automatically generated by the data processing system at least partially in response to the data processing system receiving a user input of a sensor object being dragged into the control code;
- generating revised control code based on the executed simulation model and control code;
- generating controller-specific control code based on the revised control code; and
- executing the simulation model and the controller-specific control code, the controller-specific control code interacting with the simulation model.

16. The computer-readable storage medium of claim 15, wherein the concurrently executing and generating revised control code steps are performed repeatedly until the data processing system receives an indication that a behavior of the simulation model is correct.

17. The computer-readable storage medium of claim 15, wherein the generating revised control code includes modifying the control code based on the state of the sensor.

18. The computer-readable storage medium of claim 15, wherein the controller-specific control code is executed using a specific controller corresponding to the controller-specific control code.

19. The computer-readable storage medium of claim 15, wherein the controller-specific control code is executed using a simulation of a specific controller corresponding to the controller-specific control code.

20. The computer-readable storage medium of claim 15, wherein the control code controls a simulated physical controller.

21. The computer-readable storage medium of claim 15, further comprising instructions that, when executed, cause a data processing system to display the simulation model, sensor and actuator states, and control code states while executing the simulation model and the controller-specific control code.

* * * * *